United States Patent
Shioya

(10) Patent No.: US 7,809,780 B2
(45) Date of Patent: Oct. 5, 2010

(54) INFORMATION MANAGEMENT DEVICE, RECORDING MEDIUM STORING INFORMATION MANAGEMENT PROGRAM, COMPUTER DATA SIGNAL EMBODIED IN A CARRIER WAVE AND INFORMATION MANAGEMENT SYSTEM

(75) Inventor: Masanori Shioya, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 414 days.

(21) Appl. No.: 11/684,725

(22) Filed: Mar. 12, 2007

(65) Prior Publication Data

US 2008/0046669 A1 Feb. 21, 2008

(30) Foreign Application Priority Data

Aug. 18, 2006 (JP) ............... 2006-223272

(51) Int. Cl.
*G06F 17/045* (2006.01)
(52) U.S. Cl. .............. 707/829; 707/828; 707/822; 707/823; 707/827
(58) Field of Classification Search ........... 707/828, 707/829
See application file for complete search history.

(56) References Cited

U.S. PATENT DOCUMENTS

| | | | | |
|---|---|---|---|---|
| 6,002,402 A * | 12/1999 | Schacher | | 715/810 |
| 6,330,572 B1 * | 12/2001 | Sitka | | 707/205 |
| 6,466,238 B1 * | 10/2002 | Berry et al. | | 715/847 |
| 6,489,970 B1 * | 12/2002 | Pazel | | 715/763 |
| 6,684,210 B1 | 1/2004 | Takechi et al. | | |
| 7,092,977 B2 * | 8/2006 | Leung et al. | | 707/205 |
| 2002/0120673 A1 * | 8/2002 | Tolson et al. | | 709/202 |
| 2002/0122076 A1 * | 9/2002 | Nakaki | | 345/847 |
| 2004/0165008 A1 * | 8/2004 | Levine et al. | | 345/789 |
| 2004/0199529 A1 * | 10/2004 | Clark et al. | | 707/100 |
| 2006/0259964 A1 * | 11/2006 | Maldonado et al. | | 726/16 |

FOREIGN PATENT DOCUMENTS

| | | | |
|---|---|---|---|
| JP | 11-296423 A | 10/1999 | |
| JP | 2000-082002 A | 3/2000 | |
| JP | 2001-092720 A | 4/2001 | |

(Continued)

OTHER PUBLICATIONS

Norio Tamura; "How to Operate Software Quickly"; Nikkei PC 21; Feb. 1, 1998; pp. 136-141; vol. 3, No. 3; Japan:Nikkei BP Co.

(Continued)

*Primary Examiner*—Mohammad Ali
*Assistant Examiner*—Sheryl Holland
(74) *Attorney, Agent, or Firm*—Sughrue Mion, PLLC

(57) ABSTRACT

An information management device, including a memory that stores actual information and reference information referring to the actual information; a setting unit that sets to inhibit creation of reference information, regarding with actual information for which creation of reference information is to be inhibited; a receiving unit that receives a request for creation of reference information for referring to actual information; and a control unit that controls to inhibit the requested creation of the reference information, regarding with the actual information for which the creation of the reference information is set to be inhibited.

16 Claims, 8 Drawing Sheets

FOREIGN PATENT DOCUMENTS

| | | |
|---|---|---|
| JP | 2001-101050 A | 4/2001 |
| JP | 2001-202279 A | 7/2001 |
| JP | 2004-185286 A | 7/2004 |
| JP | 2004-185568 A | 7/2004 |
| JP | 2006-215665 A | 8/2006 |

OTHER PUBLICATIONS

Kazuaki Hashimoto; "Under Ground Track, Tool for Destroying a Dubious Evidence"; Net Runner; Dec. 1, 2005; p. 100; vol. 17, No. 12; Japan:Softbank Creative Ltd.

* cited by examiner

INFORMATION MANAGEMENT DEVICE, RECORDING MEDIUM STORING INFORMATION MANAGEMENT PROGRAM, COMPUTER DATA SIGNAL EMBODIED IN A CARRIER WAVE AND INFORMATION MANAGEMENT SYSTEM

CROSS-REFERENCE TO RELATED APPLICATIOINS

This application is based on and claims priority under 35 USC 119 from Japanese Patent Application No. 2006-223272 filed on Aug. 18, 2006.

BACKGROUND

1. Technical Field

The invention relates to an information management device, a recording medium storing an information management program, a computer data signal embodied in a carrier wave and an information management system.

2. Related Art

Files and documents which are referred to by plural users are structured such that they are managed by a file system or a document management system and can be referred to from any place on a network. Such systems generally form a hierarchical structure based on attribute information about files and documents subjected to management and trace the hierarchical structure to refer to a prescribed file or document.

As another method, reference information including address information about a storage region storing actual information related to files and documents is prepared, and this reference information is used to easily access even a file present in a deep hierarchy of a system. This reference information is generally called as a reference, and makes it possible to directly access arbitrary information.

Use of the reference allows direct access to a desired file or a document and improves an access efficiency. A typical example of the reference includes, for example, a shortcut of Microsoft.

The reference is generally information which makes it possible to access the files and documents managed by the file system or the document management system, so that it becomes valid when a file or a document to be accessed is present in the storage region indicated by the address information related to the reference. Thus, if a file or a document is deleted from a reference destination, the reference created for the file or the document might become meaningless.

SUMMARY

An aspect of the present invention provides an information management device, including a memory that stores actual information and reference information referring to the actual information; a setting unit that sets to inhibit creation of reference information, regarding with actual information for which creation of reference information is to be inhibited; a receiving unit that receives a request for creation of reference information for referring to actual information; and a control unit that controls to inhibit the requested creation of the reference information, regarding with the actual information for which the creation of the reference information is set to be inhibited.

BRIEF DESCRIPTION OF THE DRAWINGS

Embodiments of the present invention will be described in detail based on the following figures, wherein.

DETAILED DESCRIPTION

Embodiments of the information management device, a recording medium storing an information management program, a computer data signal embodied in a carrier wave and an information management system according to the invention will be described in detail with reference to the accompanying drawings.

Exemplified Embodiment 1

Figure 1:
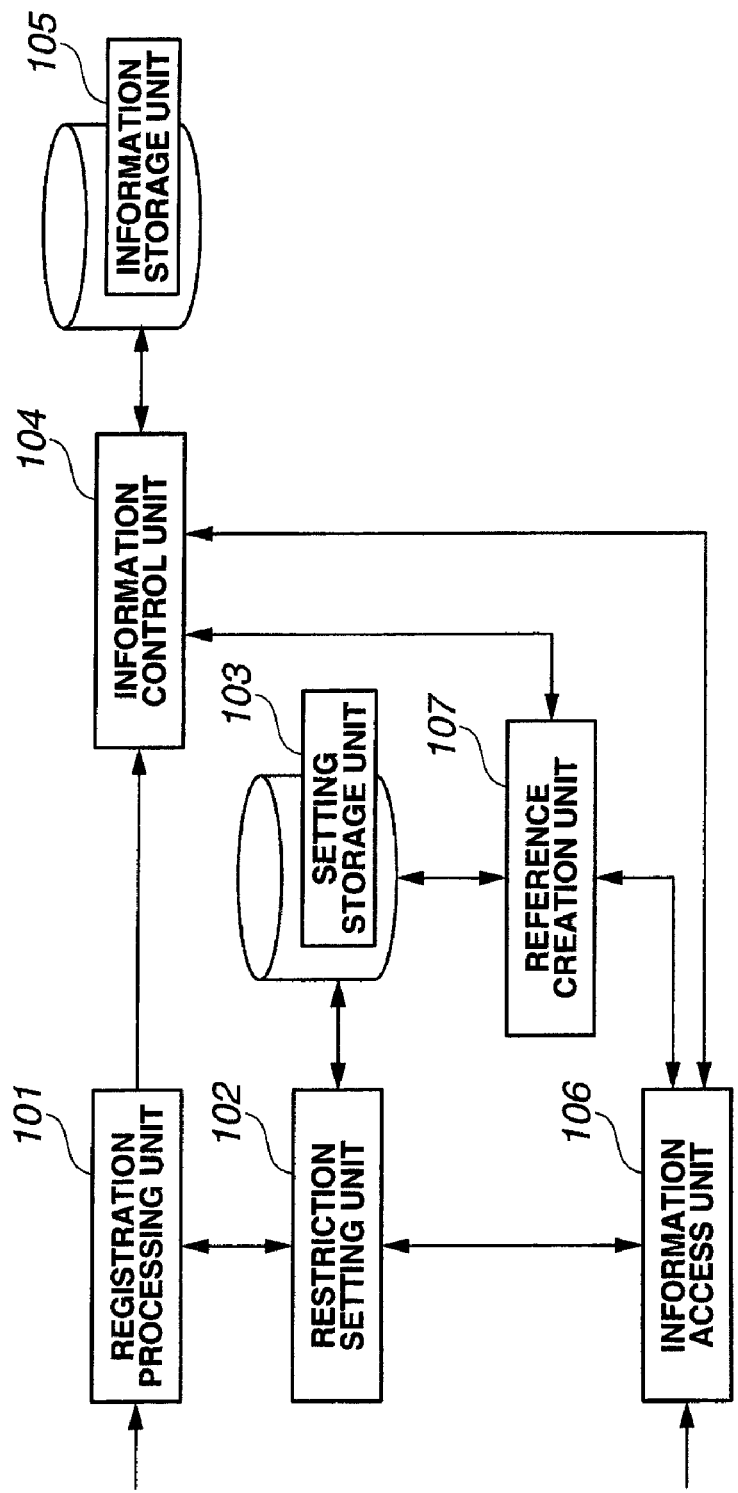
FIG. 1 is a system configuration diagram configured by applying the information management device, information management program and information management system according to the invention.

FIG. 1 is an example of a system configuration diagram configured by applying the information management device, information management program and information management system according to the invention.

In FIG. 1, the information management system is a system which is comprised of a registration processing unit 101, a restriction setting unit 102, a setting storage unit 103, an information control unit 104, an information storage unit 105, an information access unit 106 and a reference creation unit 107, and performs restriction of creation of reference information to refer to actual information such as files and documents managed by the information storage unit 105 and restriction of reference of actual information by means of the reference information.

The reference information is information which is also called a reference and made possible to directly refer to the information managed by the information storage unit 105. This reference information is called as the "reference" in the following description.

The information storage unit 105 stores actual information which is referred to by the reference, and the actual information indicates files and documents such as, for example, image data, audio data, drawings, character string data. Such information are collectively called as the "file" in the following description.

The information storage unit 105 has its hierarchical structure configured of a storage (also called as the "folder") having hierarchical information and manages the folders of respective hierarchies in association with the files. For the individual folders, a hierarchical distance between the own folder and another folder can be measured according to the hierarchical information. For example, the numbers of folders traced to reach from the own folder to the other folder can be determined as the hierarchical distance, and the hierarchical distance from the own folder to the folder which is present in the nearest hierarchy can be measured as "1". And, the folder in a third hierarchy of the hierarchical structure can be measured as having a hierarchical distance "3" in view of the most significant root folder.

Then, the configurations of a processing to set restriction to reference creation and a processing to refer to the files managed by the information storage unit 105 will be described below.

The processing to set restriction to the reference creation is performed on the files managed by the information storage unit 105 or a file to be registered newly, and it is performed by the restriction setting unit 102. Meanwhile, the processing to refer to files is a processing wherein a reference request is received by the information access unit 106, and the files managed by the information storage unit 105 are referred to. And, the information access unit 106 also receives a reference creation request and performs the processing according to the set restriction.

First, the configuration of the processing to set restriction to the reference creation will be described.

Upon receiving a request for new registration of a file and a request for setting the restriction to the files managed by the information storage unit 105, the registration processing unit 101 performs the registration processing of the file. Incidentally, where restriction is set on a registered file, the file managed by the information storage unit 105 is obtained via the information control unit 104.

The registration processing is a processing to register a file in the information storage unit 105 by creating a folder in a designated hierarchy of the information storage unit 105 and associating the file with the folder.

The restriction setting unit 102 to which the restriction setting request is made from the registration processing unit 101 performs a processing to set the restriction whether the creation of a reference for each file is permitted or rejected. And, the reference can be created only when the creation of the reference is "permitted".

As a method of setting the restriction of the reference creation performed by the restriction setting unit 102, there is, for example, a setting method using a setting screen. When the setting screen is used to set the restriction, an operator operates the setting screen to set the restriction of the reference creation for each file.

Another method stores previously a setting file, in which conditions to reject the reference creation are written, in the setting storage unit 103 and sets the rejection of the reference creation for a file if it is applicable to the conditions written in the setting file. For a file which is not applicable to the conditions, the reference creation can be permitted.

For example, the latter method can set the above-described hierarchical distance as a condition to reject the reference creation. In such a case, when a restriction setting request is made from the registration processing unit 101, the hierarchical distance is calculated according to the registration location (or a scheduled registration location) of a file, for which the reference is created, and the reference creation location.

And, it is set to reject the reference creation when the calculated hierarchical distance is not smaller than the hierarchical distance shown in the conditions for the setting file.

By such a method, the restriction setting information for the creation of the reference set by the restriction setting unit 102 is stored in the setting storage unit 103.

The setting storage unit 103 is comprised of a storage device such as a rewritable RAM (Random Access Memory) and stores the restriction setting information related to the reference creation set by the restriction setting unit 102. The setting information is information which sets to associate file IDs with all files managed by the information storage unit 105 and to have the individual file IDs set to permit or reject the reference creation.

This setting information can also be configured of a "file ID management table" in which the address information and the file ID in the storage region on the information storage unit 105 storing the files are associated and a "reference creation possibility setting table" in which the setting information about whether the reference creation is permitted is associated with the file IDs in the file ID management table. It is needless to say that these tables may be combined into one table and managed in a normalized state.

And, the restriction setting unit 102 having stored the setting information in the setting storage unit 103 notifies the registration processing unit 101 of the completion of the restriction setting of the reference creation. The notified registration processing unit 101 transfers the file to the information control unit 104, and the information control unit 104 stores the file in the designated region of the information storage unit 105. The information control unit 104 performs access management when the file is registered in the information storage unit 105 and when the files managed by the information storage unit 105 are referred to.

Figure 2:
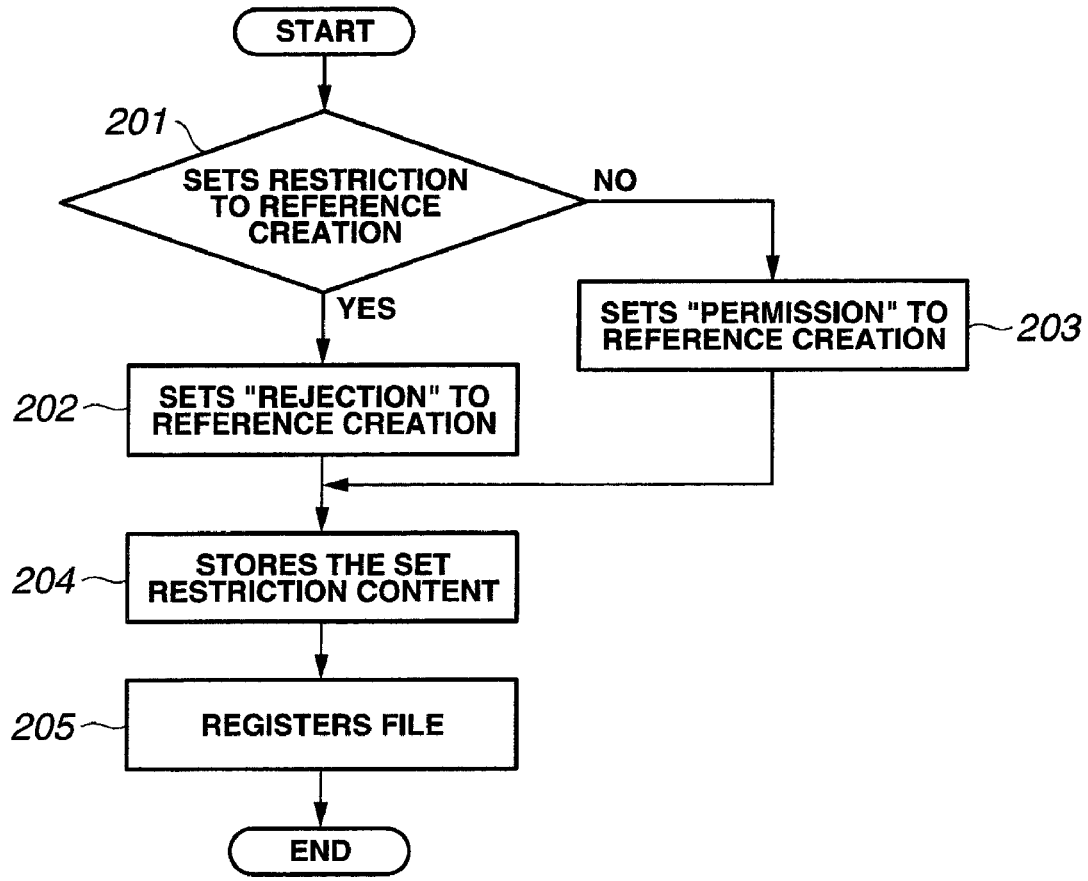
FIG. 2 is a flow chart showing a flow of a processing to restrict reference creation according to the invention.

A flow of the processing to set the restriction to the reference creation performed by the restriction setting unit 102 is shown in the flow chart of FIG. 2.

The processing to refer to the files managed by the information storage unit 105 will be described below.

When the information access unit 106 receives a request for a file, the contents of the request received by the information access unit 106 are identified to judge whether the request is a reference creation request or a reference request for a file managed by the information storage unit 105.

In a case where the request is a reference creation request, it is notified to the reference creation unit 107. Meanwhile, where it is a reference request for a file managed by the information storage unit 105, the requested file is obtained from the information storage unit 105 and transferred to the requesting source in a state which can be referred to.

The reference creation unit 107 to which the reference creation request is notified from the information access unit 106 refers to the setting of restriction to reference creation for the file according to the setting information stored in the setting storage unit 103, and if the creation of a reference for that file is rejected, notifies the information access unit 106 of the rejection of the reference creation. At this time, the information access unit 106 notifies the requesting source that a reference for the file cannot be created.

In a case where the reference creation is permitted, the reference creation unit 107 requests the information control unit 104 for address information for the file. The information control unit 104 obtains the address information for referring to the files managed by the information storage unit 105 and notifies the reference creation unit 107.

Thus, the reference creation unit 107 creates a reference containing its address information and stores in a designated location.

FIG. 2 is a flow chart showing a flow of the processing to restrict the reference creation according to this embodiment.

FIG. 2 shows a processing to perform setting for restriction to the reference creation for new registration of a file and a registered file. When a restriction setting request is made for the reference creation, it is judged whether the restriction to the reference creation is set for the file (201). This judging processing is a processing to judge whether the restriction to the reference creation is set using the setting screen or the restriction is set by applying to the previously determined setting file.

Where it is set to reject the reference creation using the setting screen or it is applicable to the conditions for the setting file as a result of the judging processing, it is judged that restriction to the reference creation is set (YES in 201), and "rejection" of the reference creation for the file is set (202).

Meanwhile, where the restriction to the reference creation is not set (NO in 201), setting for "permission" of the reference creation for the file is made (203). Setting information recording the set restriction is stored (204).

And, the file is registered (204), and the processing is terminated.

The restriction to the reference creation can be set by the above processing.

Figure 3:
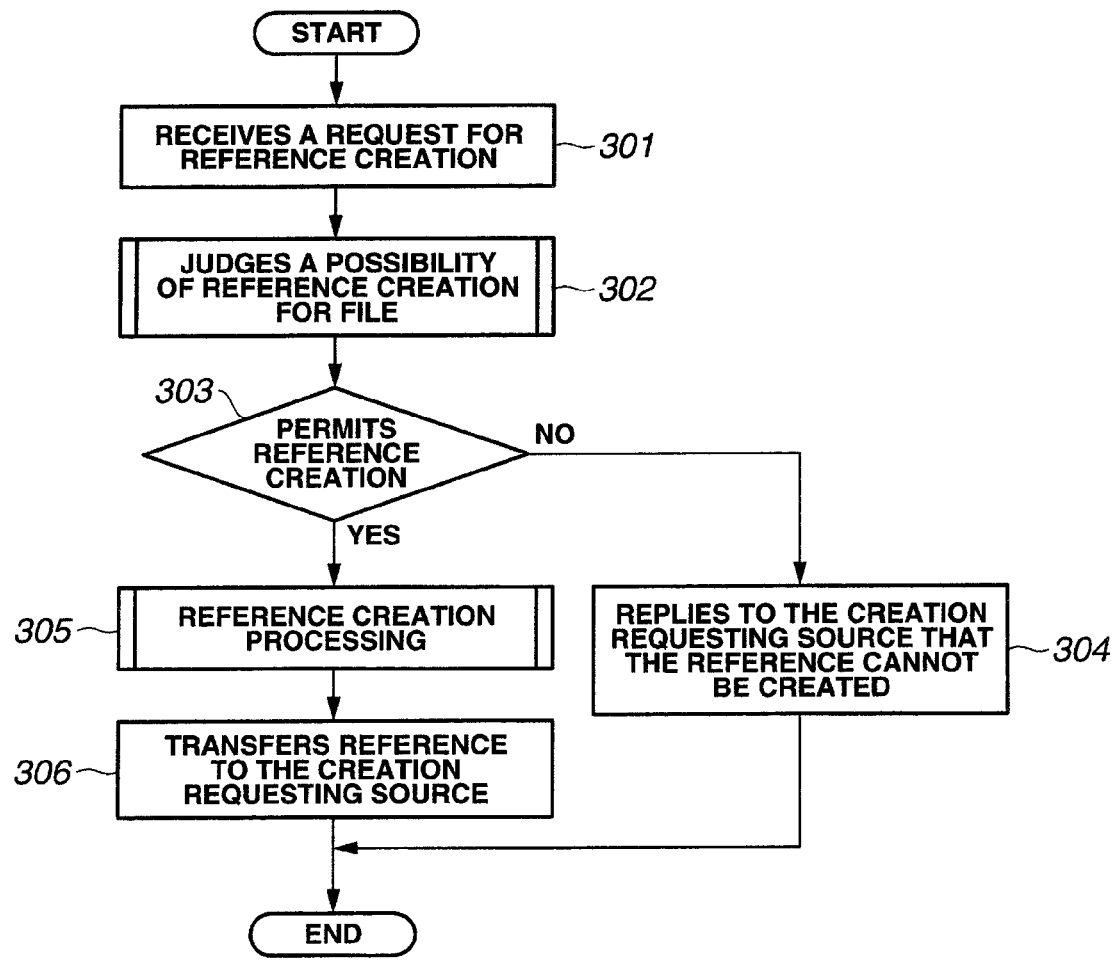
FIG. 3 is a flow chart showing a flow of a processing to create a reference in the information management device and information management system of the invention.

FIG. 3 is a flow chart showing a flow of the processing to create a reference in the information management device and information management system of the embodiment.

In FIG. 3, when a request for reference creation is received (301), it is judged whether the reference creation set for the file, for which the reference is created, is "permitted" or "rejected" (302). The flow chart of the judging processing is shown in detail in FIG. 4 and FIG. 5.

It is judged whether the reference creation is permitted according to the result of the judging processing (303). In a case where the reference creation is "rejected" (NO in 303), it is sent back to the creation requesting source that the reference cannot be created (304), and the processing is terminated.

Meanwhile, where the reference creation is "permitted" (YES in 303), a reference including address information for the file is created (305), and the created reference is transferred to the creation requesting source (306).

Figure 6:
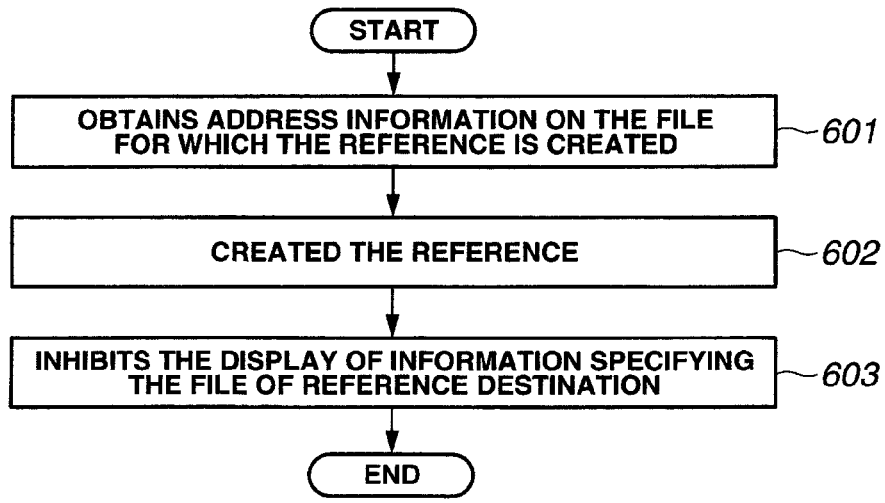
FIG. 6 is a flow chart to create a reference having information on a file of which display is inhibited.

Another example of the reference creation processing is indicated by the flow chart of FIG. 6.

The flow chart shown in FIG. 6 shows a processing to create a reference in a state that the display of address information for access to the file is inhibited. First, address information for the storage region where the file for which the reference is created is stored or address information for storage destination is obtained (601).

A reference containing the address is created (602), and it is set to inhibit the display of information, such as address information and file name, indicated by the created reference which enables to specify the file of the reference destination (603).

Subsequently, the detail flow of the processing to judge the possibility of the reference creation shown in FIG. 3 will be described with reference to FIG. 4 and FIG. 5.

Figure 4:
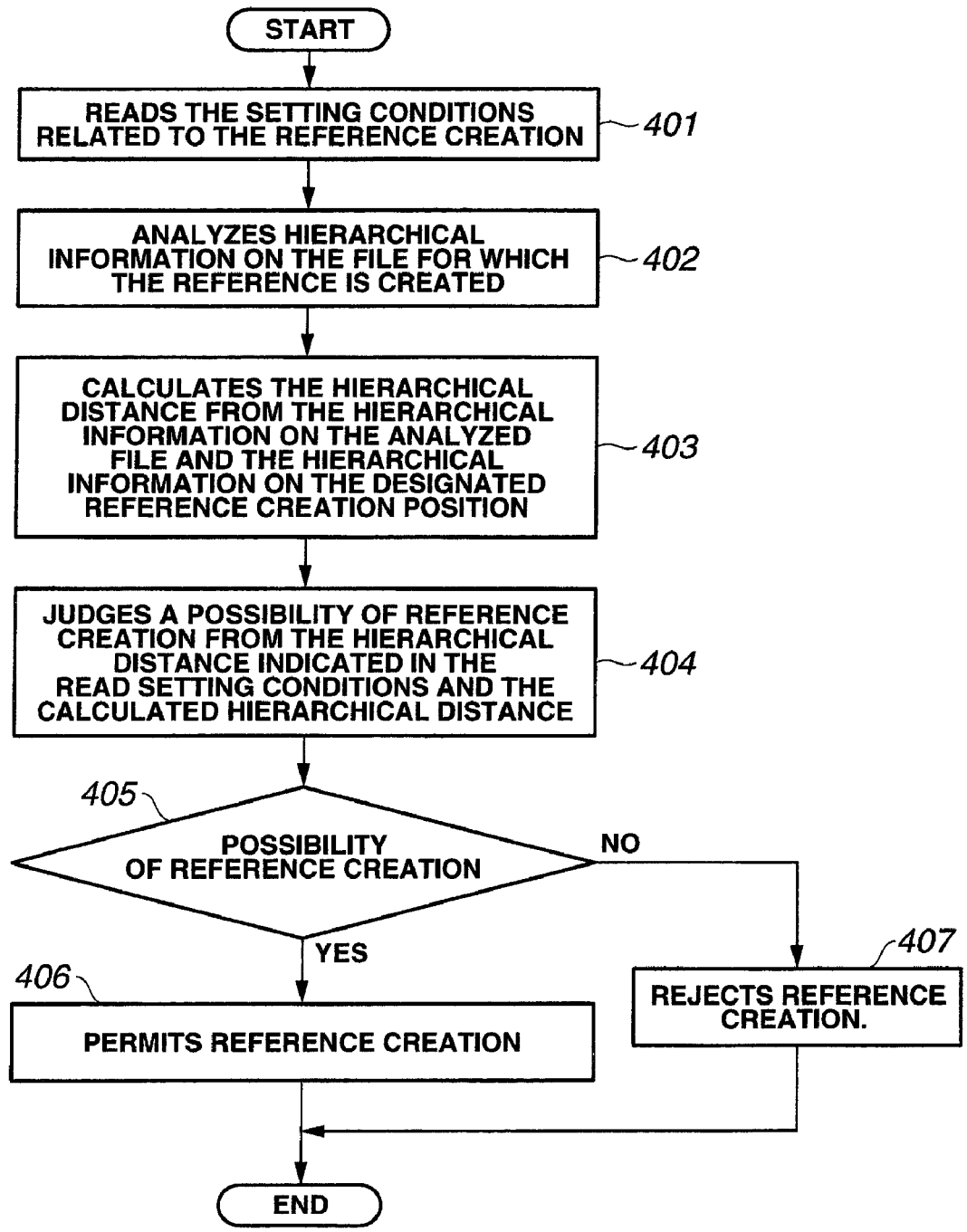
FIG. 4 is a flow chart showing a detail flow of a processing for judging whether or not the reference creation shown in FIG. 3 can be performed.

The flow chart of FIG. 4 is a flow of the processing to create a reference of the file managed by the folder forming a hierarchical structure, showing a processing to reject the reference creation when a hierarchical distance between the individual folders is at a prescribed level or larger.

In FIG. 4, when the reference creation is requested, the processing is started, and the setting conditions related to the reference creation are read (401). For example, the hierarchical distance value to reject the reference creation is read as a setting condition.

Then, hierarchical information on the file for which the reference is created is analyzed (402), and the hierarchical distance is calculated from the analyzed hierarchical information and the hierarchical information on the position designated as a reference creation destination (403).

And, the calculated hierarchical distance and the read hierarchical distance are compared to judge whether the reference can be created (404). According to the judged result, it is judged whether the reference can be created (405). For example, if it is set that the reference creation is rejected when the calculated hierarchical distance is larger than the read hierarchical distance, it is judged that the reference can be created when the calculated hierarchical distance is smaller than the read hierarchical distance (YES in 405).

Meanwhile, when the calculated hierarchical distance is larger than the read hierarchical distance, it is judged that the reference can not be created (NO in 405).

Where the reference creation is possible (YES in 405), it is set as "permission" (406), and where the reference creation cannot be made (NO in 405), it is set as "rejection" (407).

When it is necessary to trace not a hierarchical distance between a folder in which a file is stored and a folder which is to store the reference of that file but from the folder which stores the file to the folder which is positioned in a hierarchy higher than the prescribed number of hierarchies to reach from the folder in which the file is stored to the folder which is to store the reference of that file, it may be set as "rejection" and, if not so, it may be set as "permission". And, when it is necessary to trace from a root folder to the folder which is positioned in a hierarchy within the prescribed number of hierarchies to reach from the folder in which the file is stored to the folder which is to store the reference of that file, it is set as "rejection", and if not so, it may be set as "permission".

Figure 5:
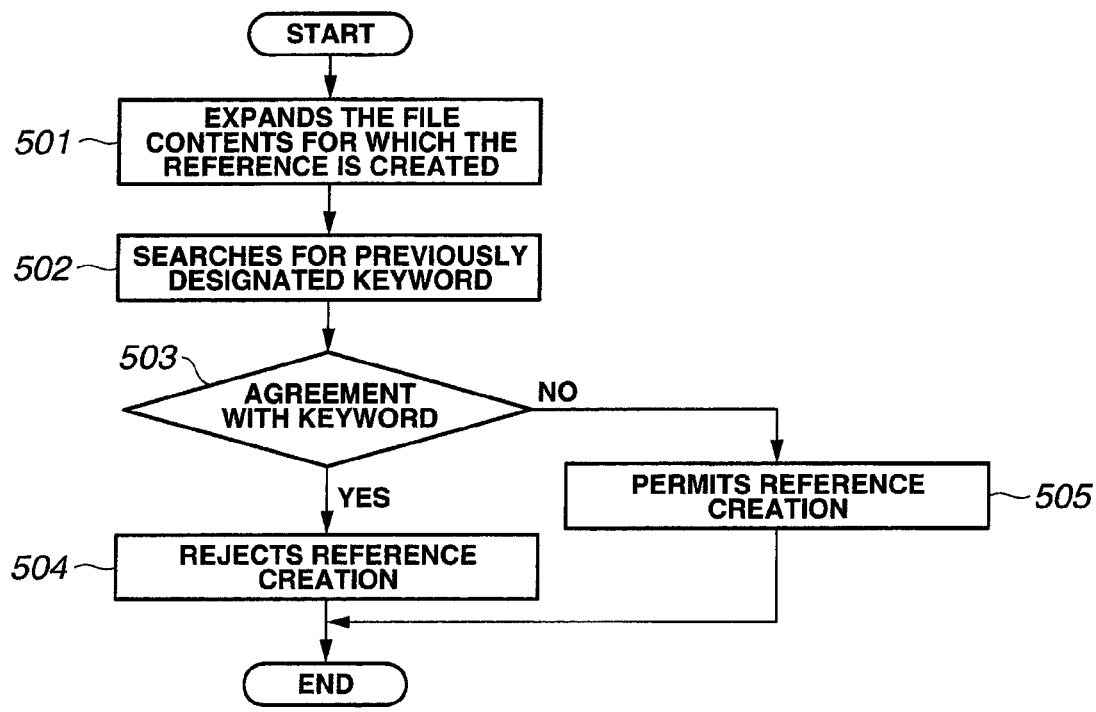
FIG. 5 is another flow chart showing a detail flow of a processing for judging whether or not the reference creation shown in FIG. 3 can be performed.

The flow chart of FIG. 5 shows a flow of the processing that when the file for which the reference is created includes particular information (hereinafter also referred to as "keyword"), restriction is performed to reject the reference creation for the file.

In FIG. 5, when the reference creation is requested, the processing is started, and the contents of the file for which the reference is created is expanded (501). It is searched to see whether the expanded file contains a previously designated keyword (502), and it is judged whether the keyword is contained in the file (503). If the previously designated keyword is contained in the file (YES in 503), the restriction is set to make "rejection" of the reference creation for that file (504).

Meanwhile, if the keyword is not contained (NO in 503), restriction for "permission" of the reference creation for the file is set (505).

Figure 7A:
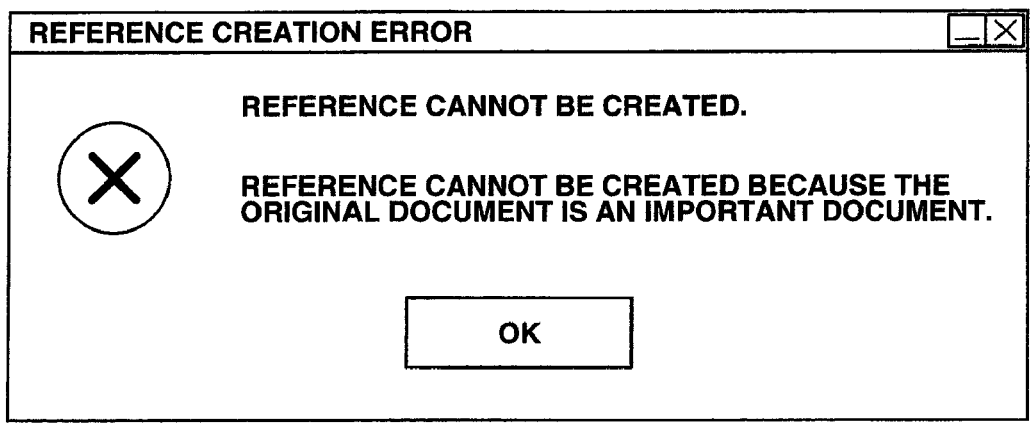
FIGS. 7A and 7B are diagrams showing examples of a screen displayed when the creation of a reference is rejected.
Figure 7B:
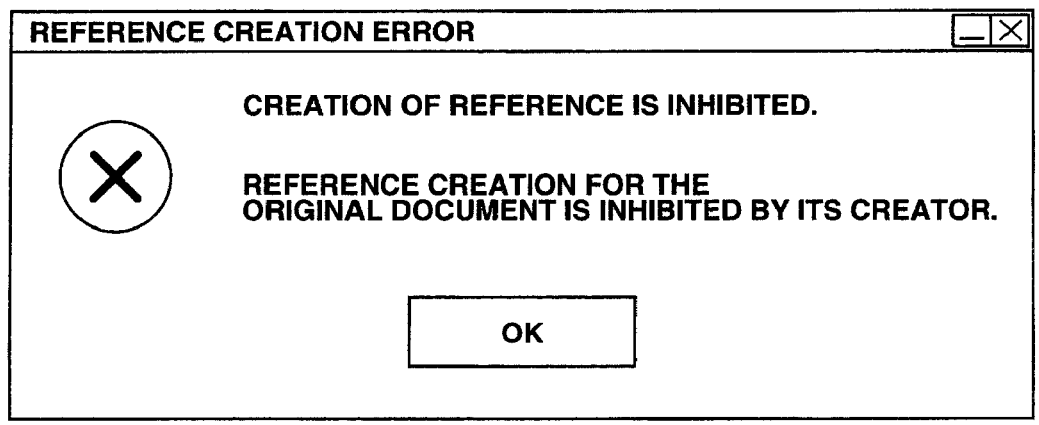

FIGS. 7A and 7B are diagrams showing examples of screens displayed when the reference creation is rejected.

FIGS. 7A and 7B are screens displayed when it is judged that the reference creation cannot be made according to the judgment for the possibility of the reference creation as described above.

In the present embodiment, creation of the reference for referring to the file is restricted; however, it is also possible to restrict creation of a reference for referring to the reference that refers to the file.

Exemplified Embodiment 2

In the embodiment 1, it is configured to restrict the reference creation and to create the reference according to the restriction. The embodiment 2 describes an example that the reference creation is possible but prescribed restriction is made when the created reference is used to refer to the file.

Figure 8:
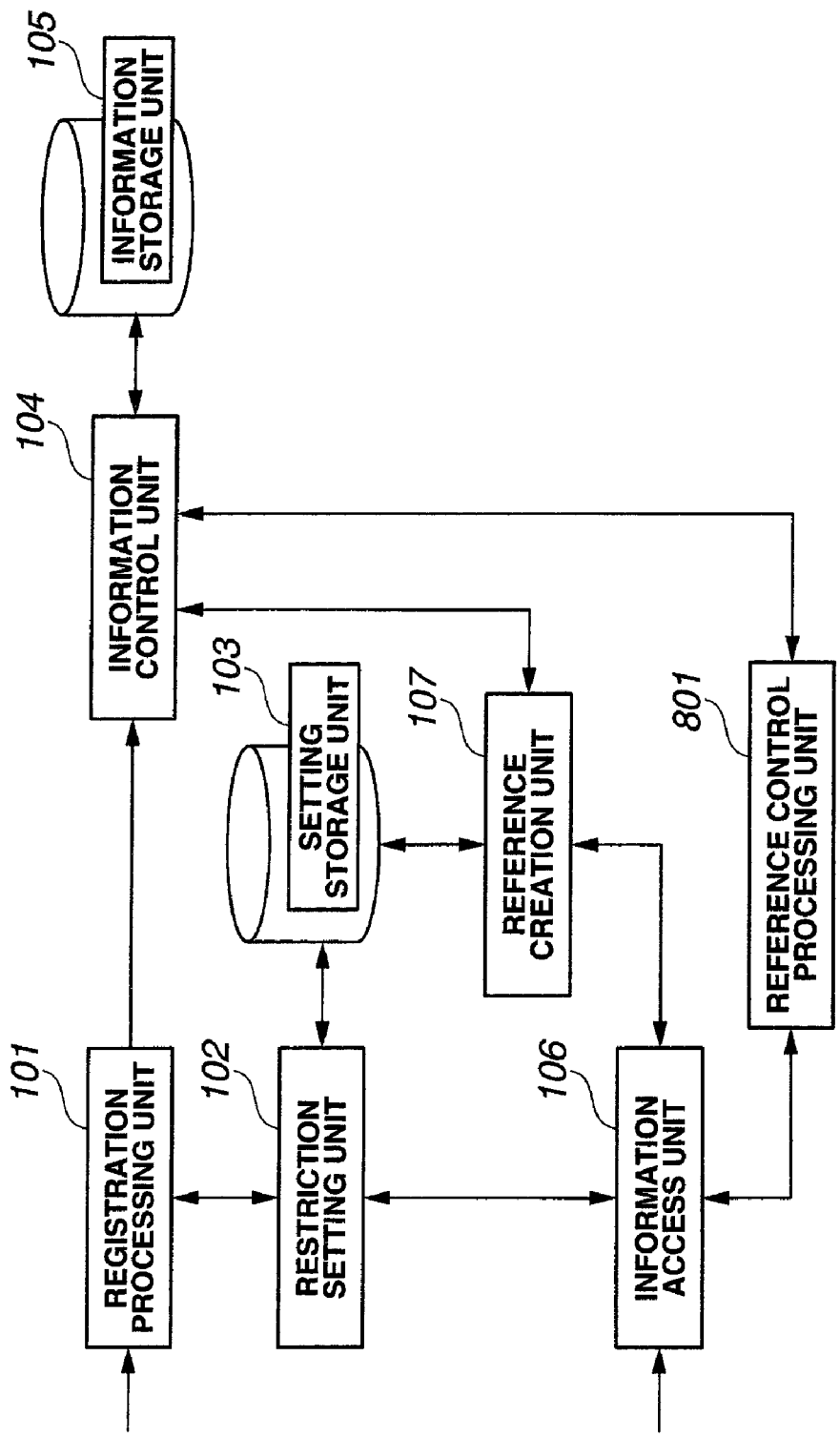
FIG. 8 is another system configuration diagram configured by applying the information management device and information management system according to the invention.

FIG. 8 shows an example of another system configuration diagram configured by applying the information management device and information management system according to the invention and similar to the system configuration diagram shown in FIG. 1. Therefore, differences from FIG. 1 are mainly described.

In the present embodiment, creation of the reference for referring to the file is restricted; however, it is also possible to restrict creation of a reference for referring to the reference that refers to the file.

FIG. 8 is a diagram showing a system configuration having a reference control processing unit 801 added to the system configuration diagram shown in FIG. 1, and the reference control processing unit 801 shown in FIG. 8 controls whether it is possible to refer to the files stored in the information storage unit 105.

When the information access unit 106 receives a request for referring to a file stored in the information storage unit 105, the reference request is transferred from the information access unit 106 to the reference control processing unit 801, and the reference control processing unit 801 analyzes the requesting source, judges whether the requesting source refers to a file according to the reference and controls whether it is possible to refer to the file.

If it is judged that the request for file reference is made according to the reference, the reference control is performed based on the previously designated setting information.

As the content of the setting information, for example, the hierarchical distance between the reference of the requesting source and the file of the reference destination can be designated. In this case, the reference control is performed when the distance is larger than the previously designated hierarchical distance. If it is smaller than the designated hierarchical distance, it is made possible to perform ordinary file reference.

The reference control may be performed when it is necessary to follow not the hierarchical distance but from the folder in which the file of the reference destination is stored to the folders which are located in a hierarchy higher than the prescribed number of hierarchies in order to reach from the folder in which the file of the reference destination is stored to the folder in which the reference of the requesting source is stored. And, the reference control may be performed when it is necessary to follow from the root folder to the folder located in a hierarchy within the prescribed number of hierarchies in order to reach from the folder in which the file of the reference destination is stored to the folder in which the reference of the requesting source is to be stored.

As an example of the above reference control, there are reference restriction to reject the file reference and to restrict a reference portion, and functional restriction to restrict usable functions.

An example of performing the above-described reference restriction and functional restriction to refer to the files of a prescribed hierarchical distance or more as the setting information will be described with reference to FIG. 9.

Figure 9:
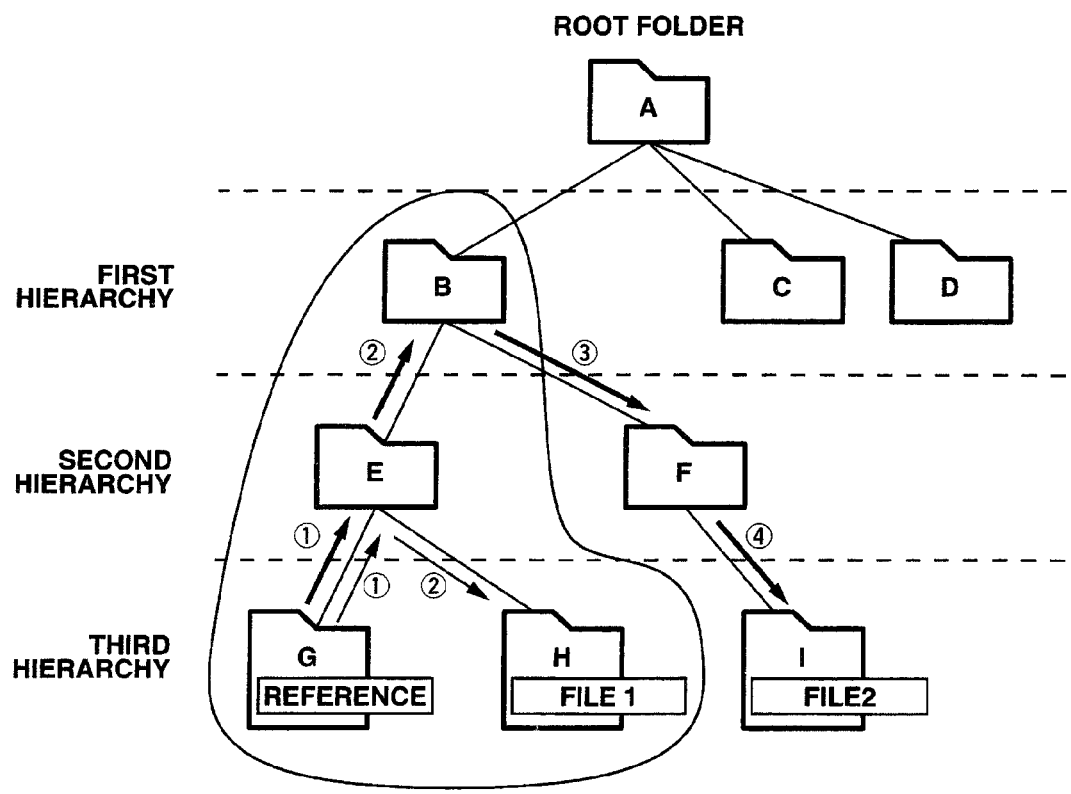
FIG. 9 is a diagram showing a file management structure in a hierarchical structure.

FIG. 9 shows an example that folders which are storages having hierarchical information form the hierarchical structure shown in the drawing, and files are stored in associated with the individual folders.

The hierarchical structure shown in FIG. 9 has a structure in that folder B, folder C and folder D are associated below the hierarchy of folder A which is the root folder, folder E and folder F are associated below the hierarchy of the folder B, folder G and folder H are associated below the hierarchy of the folder E, and folder I is associated with the folder F.

Viewing from the folder A which is the root folder, the folder B, the folder C and the folder D are located in a first hierarchy, the folder E and the folder F are located in a second hierarchy, and the folder G, the folder H and the folder I are located in a third hierarchy.

In the above-described hierarchical structure, it is assumed that a hierarchical distance to perform the reference control of the setting information described above is determined as "3", and a case where file 1 in the folder H is referred to from the reference in the folder G, and a case where file 2 in the folder I is referred to from the reference in the folder G will be described.

In the former case, calculation processing of a hierarchical distance is performed based on hierarchical information possessed by the folder G and hierarchical information possessed by the folder H to calculate the hierarchical distance to the file 1 as "2". The calculated hierarchical distance "2" is smaller than the hierarchical distance "3" of the setting information, so that it is not subjected to the reference control to perform reference restriction or functional restriction, and the file 1 can be referred to by the reference of the requesting source.

In the latter case, calculation processing of a hierarchical distance is performed based on the hierarchical information possessed by the folder G and the hierarchical information possessed by the folder I to calculate the hierarchical distance to the file 2 as "4". The calculated hierarchical distance "4" is larger than the hierarchical distance "3" of the setting information, so that reference restriction and functional restriction are performed.

As an example of the reference restriction, it can be made possible that only the first page can be referred to, and as an example of the functional restriction, it can be made possible that only a display function is valid, and a printout function and the like are inhibited.

Specifically, the file 2 in the folder I can be made possible that its first page only can be referred to by performing the reference restriction, and only the display of the file 2 is made possible by performing the functional restriction.

Thus, the reference control processing unit 108 shown in FIG. 8 controls a file, which applies to the setting information, at the time of referring to the file.

It is to be noted that the present invention is not limited to the embodiments described above and shown in the drawings and other changes and modifications may be made without departing from the scope of the invention.

The invention can also configure an information management system that a program for performing the above-described operation by an information management system provided with a communication function or configuring the above-described means stored in a recording medium (CD-ROM, DVD-ROM, etc.) is installed into a computer and executed to perform the above-described processing. The computer configuring the information processing system has a CPU (Central Processor Unit), a ROM (Read Only Memory), a RAM (Random Access Memory), and a hard disk connected via a system bus. The CPU performs a processing according to the program stored in the ROM or the hard disk with the RAM used as a work area.

And, the medium for supplying a program may be a communication medium (a medium such as a communication line or a communication system which holds a program temporarily or fluidally). For example, the program may be posted on an electronic bulletin board (BBS: Bulletin Board Service) of a communication network to deliver it through the communication line.

The invention can be applied to the restriction to the creation of reference information for referring to actual information to be stored in the information storage region.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

What is claimed is:

1. An information management device, comprising:
a memory that stores actual information and reference information referring to the actual information;
a setting unit that sets restriction information to inhibit creation of reference information regarding actual information for which creation of reference information is to be inhibited;
a receiving unit that receives a request for creation of reference information for referring to actual information; and
a control unit that controls to inhibit the requested creation of the reference information regarding the actual information for which the creation of the reference information is set to be inhibited,
wherein the restriction information is set to inhibit the creation of the reference information at a reference information location according to a hierarchical distance between the reference information location and a storage location for the actual information related to the request for creation,
wherein the hierarchical distance is a distance in a hierarchical structure of the memory between the reference information location and the storage location for the actual information, and wherein:
the memory stores the actual information and the reference information referring to the actual information in association with each storage having its hierarchical structure,
the setting unit sets a hierarchical distance which is a distance in the hierarchical structure for permitting the creation of the reference information based on the actual information stored in the memory, and
the control unit calculates the hierarchical distance between a location for creating the reference information to be created which is indicated in the request for creation received in the receiving unit and a storage location for the actual information to which the reference information refers, and controls to permit or inhibit the creation of the reference information according to a result of comparison between a calculated hierarchical distance and the hierarchical distance set by the setting unit.

2. The information management device according to claim 1, wherein the control unit inhibits the creation of the reference information if the calculated hierarchical distance is more than the hierarchical distance set by the setting unit.

3. The information management device according to claim 1, further comprising reference information creation unit that creates the reference information regarding actual information for which creation of the reference information is permitted.

4. An information management device, comprising:
a storage unit that stores actual information and reference information referring to the actual information;
a setting unit that sets restriction information that indicates whether a processing is to be restricted, wherein the processing is performed using reference information for actual information to which the reference information refers;
a receiving unit that receives a request for processing using reference information for actual information to which the reference information refers; and
a control unit that controls to restrict the requested processing related to the processing which is set to be restricted,
wherein the restriction information is set to restrict the processing performed using reference information for actual information to which the reference information refers according to a hierarchical distance between the reference information location and a storage location for the actual information related to the request for processing,
wherein the hierarchical distance is a distance in a hierarchical structure of the storage unit between the reference information location and the storage location for the actual information,
wherein:
the storage unit stores the actual information and the reference information referring to the actual information in association with each storage having its hierarchical structure,
the setting unit sets a hierarchical distance which is a distance in the hierarchical structure for permitting the creation of the reference information based on the actual information stored in the storage unit, and
the control unit calculates the hierarchical distance between a location for creating the reference information to be created which is indicated in the request for creation received in the receiving unit and a storage location for the actual information to which the reference information refers, and controls to permit or inhibit the creation of the reference information according to a result of comparison between a calculated hierarchical distance and the hierarchical distance set by the setting unit.

5. A recording medium recording an information management program which is readable by a computer to cause the computer to execute a process comprising:
storing actual information and reference information referring to the actual information;
setting restriction information to inhibit creation of reference information regarding actual information for which creation of the reference information is to be inhibited;
receiving a request for creation of reference information for actual information; and
controlling to inhibit the requested creation of the reference information, regarding with the actual information related to the request, if the restriction information is set to inhibit the creation of the reference information,
wherein the restriction information is set to inhibit the creation of the reference information at a reference information location according to a hierarchical distance between the reference information location and a storage location for the actual information related to the creation request,
wherein the hierarchical distance is a distance between the reference information location and the storage location for the actual information stored in a hierarchical structure of a memory, wherein:
the storing process comprises storing the actual information and the reference information referring to the actual information in association with each storage having its hierarchical structure, the setting process comprises setting restriction information to inhibit creation of the reference information according to a distance in the hierarchical structure for permitting the creation of the reference information based on the actual information stored in a storage unit, and the controlling process comprises calculating a hierarchical distance between a location for creating the reference information to be created which is indicated in the request for creation received in a receiving unit and a storage location for the actual information to which the reference information refers, and controlling to inhibit the requested creation of the reference information according to a result of comparison between a calculated hierarchical distance and the restriction information.

6. The recording medium recording an information management program according to claim 5, wherein
the restriction information is set to inhibit the creation of the reference information according to a requester requesting the creation of the reference information.

7. The recording medium recording an information management program according to claim 5, wherein
the restriction information is set to inhibit the creation of the reference information based on particular information contained in the actual information.

8. The recording medium recording an information management program according to claim 5, wherein said reference information is first reference information and
said controlling operates to inhibit creation of second reference information for referring to the first reference information that refers to the actual information.

9. The recording medium recording the information management program according to claim 5, wherein the controlling process comprises inhibiting the requested creation of the reference information when the calculated hierarchical distance is more than a hierarchical distance set in the restriction information.

10. The recording medium recording the information management program according to claim 5, the process further comprising creating the reference information which is permitted to be created.

11. A recording medium recording an information management program which is readable by a computer to cause the computer to execute a process comprising:
storing actual information and reference information for referring to the actual information;
setting restriction information indicating that processing is to be restricted, wherein the processing is performed using reference information for the actual information to which the reference information refers;
receiving a request for processing using the reference information for the actual information to which the reference information refers; and
controlling to restrict the requested processing related to the processing which the restriction information is set to restrict,
wherein the restriction information is set to restrict the processing performed using reference information for actual information to which the reference information refers according to a hierarchical distance between the reference information location and a storage location for the actual information related to the request for processing,
wherein the hierarchical distance is a distance between the reference information location and the storage location for the actual information stored in a hierarchical structure of a memory,
wherein:
the storing process comprises storing the actual information and the reference information referring to the actual information in association with each storage having its hierarchical structure,
the setting process comprises setting restriction information to inhibit creation of the reference information according to a distance in the hierarchical structure for permitting the creation of the reference information based on the actual information stored in a storage unit, and
the controlling process comprises calculating a hierarchical distance between a location for creating the reference information to be created which is indicated in the request for creation received in a receiving unit and a storage location for the actual information to which the reference information refers, and controlling to inhibit the requested creation of the reference information according to a result of comparison between a calculated hierarchical distance and the restriction information.

12. The recording medium recording an information management program according to claim 11, wherein
the restriction information is set to restrict the processing using the reference information for the actual information according to a requester making a request for processing on the actual information.

13. The recording medium recording an information management program according to claim 11, wherein said processing is processing of the actual information.

14. The recording medium recording an information management program according to claim 11, wherein
the restriction information is set to restrict the processing on the actual information based on particular information contained in the actual information.

15. An information management system, comprising:
an information management device provided with:
a storage unit that stores actual information and reference information referring to the actual information,
a setting unit that sets restriction information to inhibit creation of reference information regarding actual information for which creation of reference information is to be inhibited,
a receiving unit that receives a request for creation of reference information for actual information, and
a control unit that controls to inhibit the requested creation of the reference information regarding the actual information for which creation of reference information is set to be inhibited; and
a terminal provided with:
a transmitting unit that transmits the request for creation of the reference information for the actual information stored in the storage unit,
wherein the restriction information is set to inhibit the creation of the reference information at a reference information location according to a hierarchical distance between the reference information location and a storage location for the actual information related to the request for creation, wherein the hierarchical distance is a distance in a hierarchical structure of the memory between the reference information location and the storage location for the actual information, wherein:

the storage unit stores the actual information and the reference information referring to the actual information in association with each storage having its hierarchical structure, the setting unit sets a hierarchical distance which is a distance in the hierarchical structure for permitting the creation of the reference information based on the actual information stored in the storage unit, and the control unit calculates the hierarchical distance between a location for creating the reference information to be created which is indicated in the request for creation received in the receiving unit and a storage location for the actual information to which the reference information refers, and controls to permit or inhibit the creation of the reference information according to a result of comparison between a calculated hierarchical distance and the hierarchical distance set by the setting unit.

16. An information management system, comprising:

an information management device provided with:

a storage unit that stores actual information and reference information referring to the actual information, a setting unit that sets restriction information that indicates whether processing is to be restricted, wherein the processing is performed using the reference information for the actual information to which the reference information refers, a receiving unit that receives a request for processing using the reference information for the actual information to which the reference information refers, and a control unit that controls to restrict the requested processing related to the processing which is set to be restricted; and a terminal provided with:

a transmitting unit that transmits a request for the reference information stored in the storage unit for processing for the actual information to which the reference information refers, wherein the restriction information is set to restrict the processing performed using reference information for actual information to which the reference information refers according to a hierarchical distance between the reference information location and a storage location for the actual information related to the request for processing, wherein the hierarchical distance is a distance in a hierarchical structure of the storage unit between the reference information location and the storage location for the actual information, wherein:

the storage unit stores the actual information and the reference information referring to the actual information in association with each storage having its hierarchical structure, the setting unit sets a hierarchical distance which is a distance in the hierarchical structure for permitting the creation of the reference information based on the actual information stored in the storage unit, and the control unit calculates the hierarchical distance between a location for creating the reference information to be created which is indicated in the request for creation received in the receiving unit and a storage location for the actual information to which the reference information refers, and controls to permit or inhibit the creation of the reference information according to a result of comparison between a calculated hierarchical distance and the hierarchical distance set by the setting unit.

\* \* \* \* \*